(12) United States Patent
Layman et al.

(10) Patent No.: US 9,521,029 B2
(45) Date of Patent: *Dec. 13, 2016

(54) METHOD AND SYSTEMS FOR BIDIRECTIONAL OUTAGE BYPASS FOR A VOICE OVER INTERNET PRIVATE BRANCH EXCHANGE

(71) Applicant: Vocalocity, Inc., Atlanta, GA (US)

(72) Inventors: Randy Layman, Marietta, GA (US); Robert Michael Smith, Atlanta, GA (US); Keith Meyers, Powder Springs, GA (US); Barry Fleming, Roswell, GA (US)

(73) Assignee: VONAGE BUSINESS INC., Atlanta, GA (US)

( * ) Notice: Subject to any disclaimer, the term of this patent is extended or adjusted under 35 U.S.C. 154(b) by 117 days.

This patent is subject to a terminal disclaimer.

(21) Appl. No.: 13/680,067

(22) Filed: Nov. 18, 2012

(65) Prior Publication Data

US 2014/0140196 A1 May 22, 2014

(51) Int. Cl.
*H04J 1/16* (2006.01)
*H04L 29/06* (2006.01)
(Continued)

(52) U.S. Cl.
CPC ..... *H04L 29/06292* (2013.01); *H04L 41/0659* (2013.01); *H04L 65/1053* (2013.01);
(Continued)

(58) Field of Classification Search
CPC ............ H04L 41/0654; H04L 41/5009; H04L 41/0659; H04L 41/5087; H04L 43/08; H04L 65/1053; H04L 29/06292; H04M 7/003; H04W 36/14
(Continued)

(56) References Cited

U.S. PATENT DOCUMENTS 6,363,065 B1   3/2002   Thornton
6,570,855 B1   5/2003   Kung
(Continued)

OTHER PUBLICATIONS

Written Opinion Report mailed Jul. 14, 2014 for Application PCT/US2014/026095.
(Continued)

*Primary Examiner* — Shripal Khajuria
(74) *Attorney, Agent, or Firm* — Alexander Legal LLC; Joseph Pagnotta

(57) ABSTRACT

A system and method is disclosed herein for providing a bidirectional outage bypass for a hosted voice-over Internet protocol (VoIP) private branch exchange (PBX) system. An outage monitoring system is in communication with both the bidirectional bypass system and one or more bypass enablers that act at the direction of the bidirectional bypass system. The outage monitoring system detects outages and overloads, as well as, network failures between the VoIP PBX and the public switched telephone network (PSTN). The bidirectional bypass system, in response to detection of an outage, determines error-handling procedures for the bidirectional bypass based on bypass configuration data. The bypass enablers forward outgoing communications between a client device and the PSTN, in accordance the error-handling procedures, by bypassing components that are currently experiencing failures or overloads. The bypass enablers forward incoming communications for the VoIP PBX to an alternative destination in accordance with the error-handling procedures.

24 Claims, 4 Drawing Sheets

(51) Int. Cl.
    *H04L 29/14* (2006.01)
    *H04L 12/24* (2006.01)
(52) U.S. Cl.
    CPC .......... *H04L 65/1069* (2013.01); *H04L 69/40* (2013.01); *H04L 41/0246* (2013.01)
(58) Field of Classification Search
    USPC .................................................. 370/216–235
    See application file for complete search history.

(56) References Cited

U.S. PATENT DOCUMENTS

| | | | |
|---|---|---|---|
| 7,508,754 B1 | 3/2009 | Sankaranaraynan et al. | |
| 7,639,793 B1 | 12/2009 | Croak | |
| 7,865,556 B2* | 1/2011 | Kadashevich | 709/206 |
| 8,576,700 B2* | 11/2013 | Boudreaux et al. | 370/217 |
| 2005/0180396 A1* | 8/2005 | Lim | 370/352 |
| 2006/0002290 A1 | 1/2006 | Chen | |
| 2006/0072726 A1* | 4/2006 | Klein | H04M 3/42153 379/201.01 |
| 2007/0070976 A1 | 3/2007 | Mussman | |
| 2008/0130856 A1 | 6/2008 | Ku et al. | |
| 2008/0317011 A1 | 12/2008 | Datta | |
| 2010/0162034 A1 | 6/2010 | Degenhardt | |
| 2010/0216476 A1* | 8/2010 | Gupta | H04M 3/42314 455/445 |
| 2010/0220585 A1 | 9/2010 | Poulson | |
| 2010/0223494 A1 | 9/2010 | Degenhardt et al. | |
| 2011/0206037 A1 | 8/2011 | Zhakov | |
| 2011/0230196 A1* | 9/2011 | Tal et al. | 455/450 |
| 2011/0320140 A1* | 12/2011 | Butler et al. | 702/45 |
| 2012/0167208 A1* | 6/2012 | Buford et al. | 726/22 |

OTHER PUBLICATIONS

International Search Report mailed Jul. 14, 2014 for Application PCT/US2014/026095.
Nritten Opinion Report mailed Jul. 14, 2014 for Application PCT/US2014/026095.

* cited by examiner

METHOD AND SYSTEMS FOR BIDIRECTIONAL OUTAGE BYPASS FOR A VOICE OVER INTERNET PRIVATE BRANCH EXCHANGE

FIELD OF THE INVENTION

The present invention relates generally to Voice-over-Internet-Protocol (VoIP) and Session Initiation Protocol (SIP) electronic communications and, more particularly, to methods and systems for providing bidirectional bypass outage protection for both VoIP Private Branch Exchange (PBX) failures and Internet service failures.

BACKGROUND OF THE INVENTION

A Private Branch Exchange (PBX) is a telephone exchange that makes connections among the internal telephones of an organization, such as a private business or telephone network. The PBX allows these internal telephones to connect to the public switched telephone network (PSTN) via trunk lines and/or the Internet. A hosted PBX system delivers PBX functionality as a service, available over the Public Switched Telephone Network (PSTN) and/or the Internet. A telephone company typically provides hosted PBXs using equipment located in the premises of the telephone company's exchange. This means the customer organization does not need to buy or install PBX equipment and the telephone company can use the same switching equipment to service multiple PBX hosting accounts. Furthermore, Voice over Internet Protocol (VoIP) gateways can be combined with traditional PBX functionality enabling businesses and organizations to use their managed Internet/Intranet to help reduce long distance expenses, enjoy the benefits of a single network for voice and data which gives greater cost savings, mobility and increased redundancy.

For users that rely on a Voice over Internet Protocol (VoIP) Private Branch Exchanges (PBX) for their organization's communications system, reliability of the system to complete phone calls is a primary concern, and particularly of concern is what will happen if the system becomes overloaded or the system goes down. This concern may be further exacerbated if the organization relies on a Hosted VoIP PBX where the service is accessed over the Internet and shared with many other organizations, and therefore the service may be subject to greater possibility of overload or Interruption due to Internet service outages.

The requirements of a hosted VoIP private branch exchange (PBX) have created the need for a new kind of outage bypass solution. Pre-existing systems fail to protect users against failure and overload of the VoIP PBX and/or the Internet service used to connect the VoIP PBX to the users' calling device. Without such a system, if the VoIP PBX has a failure or if there are network or other problems with the connection to a user's Session Initiation Protocol (SIP) devices (telephone terminal), then users are no longer able to make or receives calls, and callers receive no notification about what sort of problem exists. Pre-existing systems may have provided some level of unidirectional bypass or override, but heretofore no system has existed that provides bidirectional bypass with outage protection for both VoIP PBX overload or failure and also internet service failure or interruption combined with a configurable problem notification capability.

The present invention meets one or more of the above-referenced needs as described herein in greater detail.

SUMMARY OF THE INVENTION

The present invention relates generally to Voice-over-Internet-Protocol (VoIP) and Session Initiation Protocol (SIP) electronic communications and, more particularly, to methods and systems for providing a bidirectional outage bypass for a voice-over Internet protocol (VoIP) private branch exchange (PBX) system. Briefly described, aspects of the present embodiments include the following.

In a first aspect, the present embodiment provides a method for a bidirectional outage bypass for VoIP PBX system by monitoring outages and overload conditions in the VoIP PBX system and communicating outage updates to a bidirectional bypass system. The bidirectional bypass uses the outage updates to communicate with one or more bypass enablers for routing incoming and outgoing communications in response to outages and overload conditions of the VoIP PBX, as well as, for network failures between the VoIP PBX and client devices managed by the VoIP PBX. The routing of the incoming and/or outgoing communications are processed by the bypass enablers at the direction of the bidirectional bypass system in accordance with a set of bypass configuration data.

In another aspect of the present embodiment, the predetermined set of rules for responding to outages and overload conditions in the VoIP PBX system is included in the bypass configuration data. In further aspect of the present embodiment, the method for intercepting incoming and/or outgoing communications with the bypass enablers and routing the communications by way of a bidirectional bypass system based on a predetermined set of rules. In one aspect, the predetermined set of rules can include forwarding incoming communication to an alternate phone number and/or to a client device voicemail system. In another aspect, the predetermined set of rules can direct the bidirectional bypass system to play a configurable audio message in response to an incoming communication.

In another aspect of the present embodiment, a method for intercepting outgoing communications with the bypass enablers and routing the communications by way of a bidirectional bypass system is based upon a set of configuration data for outgoing communications. In a further aspect of the embodiment, the outgoing communications can bypass the VoIP PBX and are forwarded directly to a public switched telephone network (PSTN). In another aspect of the invention, the outgoing communication is directed to a preconfigured audio message.

In a second aspect of the invention, a system of providing a bidirectional outage bypass for a hosted voice-over Internet protocol (VoIP) private branch exchange (PBX) system comprises an outage monitoring system in communication with a bidirectional bypass system and in communication with one or more bypass enablers for acting at the direction of the bidirectional bypass system. The outage monitoring system is configured to detect outages and overload conditions in the VoIP PBX, as well as, network failures between the VoIP PBX and the public switched telephone network (PSTN), as well as between the VoIP PBX and individual SIP devices. The bidirectional bypass system, in response to detection of an outage, determines error-handling procedures for the bidirectional bypass based on bypass configuration data. The bypass enablers forward outgoing communications between a client device and the PSTN, in accordance the error-handling procedures, by bypassing components that are currently experiencing failures or overloads. The bypass enablers forward incoming communications for the VoIP PBX to an alternative destination in accordance with the error-handling procedures.

In a third aspect of the invention, a system of providing a bidirectional outage bypass for a hosted voice-over Internet protocol (VoIP) private branch exchange (PBX) system comprises an outage monitoring system configured to detect outages and overload conditions of the VoIP PBX as well as network failures between the VoIP PBX and one or more client devices handled by the VoIP PBX. A bidirectional bypass system in communication with the outage monitoring system for error-handling in response to the detected outages, overload conditions and network failures and for directing one or more bypass enablers to route incoming and outgoing communications based on the error-handling. The bidirectional bypass system configures to the error handling based on a set of bypass configuration data.

The above features as well as additional features and aspects of the present invention are disclosed herein and will become apparent from the following description of preferred embodiments of the present invention.

This summary is provided to introduce a selection of aspects and concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
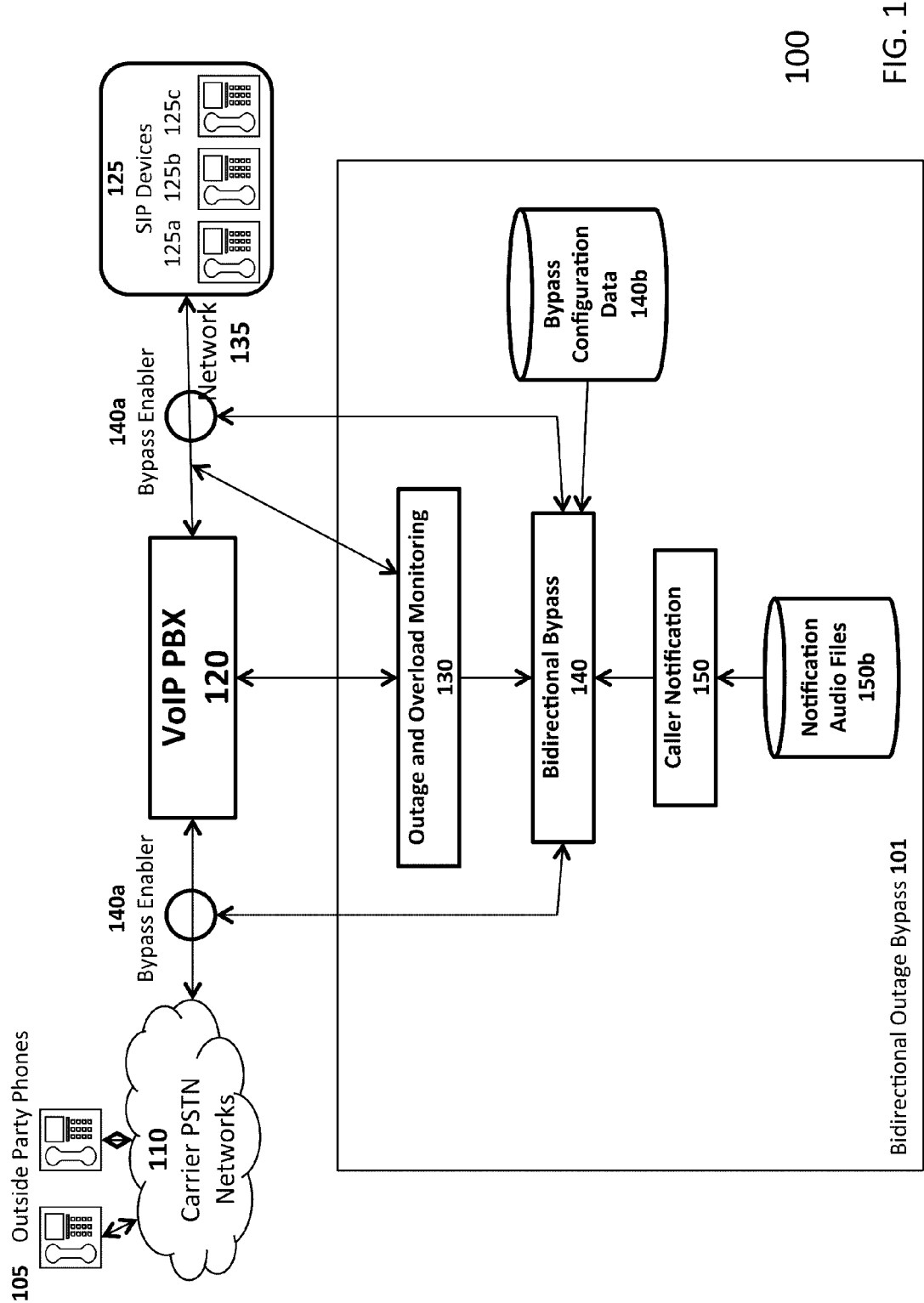
FIG. 1 is a flow diagram of an exemplary embodiment of a bidirectional outage bypass system for hosted VoIP PBX.

Before the present methods and systems are disclosed and described in greater detail hereinafter, it is to be understood that the methods and systems are not limited to specific methods, specific components, or particular implementations. It is also to be understood that the terminology used herein is for the purpose of describing particular aspects and embodiments only and is not intended to be limiting.

As used in the specification and the appended claims, the singular forms "a," "an" and "the" include plural referents unless the context clearly dictates otherwise. Similarly, "optional" or "optionally" means that the subsequently described event or circumstance may or may not occur, and the description includes instances where the event or circumstance occurs and instances where it does not.

Throughout the description and claims of this specification, the word "comprise" and variations of the word, such as "comprising" and "comprises," mean "including but not limited to," and is not intended to exclude, for example, other components, integers or steps. "Exemplary" means "an example of" and is not intended to convey an indication of preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference to each various individual and collective combinations and permutations of these can not be explicitly disclosed, each is specifically contemplated and described herein, for all methods and systems. This applies to all aspects of this specification including, but not limited to, steps in disclosed methods. Thus, if there are a variety of additional steps that can be performed it is understood that each of the additional steps can be performed with any specific embodiment or combination of embodiments of the disclosed methods.

As will be appreciated by one skilled in the art, the methods and systems may take the form of an entirely new hardware embodiment, an entirely new software embodiment, or an embodiment combining new software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, non-volatile flash memory, CD-ROMs, optical storage devices, and/or magnetic storage devices. An exemplary computer system is detailed in the discussion of FIG. 4 below.

Embodiments of the methods and systems are described below with reference to block diagrams and flowchart illustrations of methods, systems, apparatuses and computer program products. It will be understood that each block of the block diagrams and flow illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 is a flow diagram that illustrates the various aspects of an exemplary embodiment in which the present methods and systems can operate. The present disclosure relates to methods and systems for providing a bidirectional bypass system that monitors a voice over Internet protocol (VoIP) private branch exchange (PBX), the session initiation protocol (SIP) devices (which are client devices, such as Internet based telephone terminals) that register directly and interact with the VoIP PBX, and the network connections between the VoIP PBX and a plurality of SIP devices. Those skilled in the art will appreciate that present methods may be used in systems that employ both digital and analog equipment. One skilled in the art will also appreciate that provided herein is a functional description and that the respective functions can be performed by software, hardware, or a combination of software and hardware.

Turning now to FIG. 1, the bidirectional bypass system 100 includes an outage and overload monitoring system 130 that monitors the VoIP PBX 120, the SIP devices 125 that register directly and interact with the VoIP PBX 120, and the network connections between the VoIP PBX 120 and the SIP devices 125. In the case of component outages, failures, or overloads detected by the outage and overload monitoring system 130, for as long as the failures are detected, the bidirectional bypass system 100 can take command of incoming and outgoing phone calls and provides capabilities to allow calls to be completed or handled while bypassing the failed components, or in the case where they cannot or should not be handled, the system 100 provides an ability to notify the caller via one or more configurable audio messages.

In an exemplary embodiment, when an outside or third-party caller attempts to reach a user of one of the SIP devices 125 by initiating a call from their phone 105 over a carrier publicly switched telephone network (PSTN) 110. In normal operation, the call is routed to the VoIP PBX 120 in communication with the SIP device 125. The VoIP PBX 120 receives the calls and routes it to the appropriate SIP device 125, such as device 125b for example, were the call routing is completed.

In order to improve quality of service (QOS) of the VoIP PBX system 120, the network can include a bidirectional outage bypass system 101. In an exemplary embodiment, as calls from outside party phone 105 flow into the system 100 to the VoIP PBX 120, a outage and overload monitoring component (OOMC) 130 of the bidirectional bypass system 101 monitors the VoIP PBX 120 and the networks 135 for outages or overloads that directly affect the ability to complete incoming or outgoing calls for users of the SIP Devices 125 over the VoIP PBX 120. This includes the VoIP PBX 120 itself which provides call routing and call-handling features such as call transfer, hold, call forwarding, call parking, call recording, call monitoring, and many other potential features for users. This also includes the SIP devices 125, such as SIP desk phones or SIP soft phones, the users rely on for communications via the VoIP PBX 120. The monitoring further includes the network connection 135 between the VoIP PBX 120 and the SIP devices 125. The OOMC 130 monitors all of these components for failures that would affect the ability of the VoIP PBX 120 to handle incoming or outgoing calls.

The OOMC 130 monitoring could be implemented in a variety of ways. In an exemplary embodiment, the bidirectional bypass system 101 might receive regular heartbeats indicating health from any of the monitored components, or the bidirectional bypass system 101 might send non-intrusive requests to the components and monitor the responses, or the bidirectional bypass system 101 might monitor system logs to detect timeouts and other failures which might also be indicated by failure to receive regular log updates, or any combination of these techniques or a variety of other techniques commonly used to monitor computer systems and networks.

When calls and other communications come into the system 100 from the carrier PSTN network 110, the OOMC 130 monitors the VoIP PBX 120 and network 135 as described above. In an exemplary embodiment, once the OOMC 130 detects a problem, it alerts the bidirectional bypass system (BDBS) 140. The BDBS 140 receives notifications from the OOMC 130 indicating specific problems detected and, in some cases such as network or device outages, the specific users or calls being affected. Upon indication of an outage or failure, the BDBS 140 then goes into action for any incoming or outgoing calls that it determines cannot be completed due to the indicated component failure(s).

In an exemplary embodiment, for every phone call, either incoming or outgoing, where the BDBS 140 has determined bypass action is required due to a fault detection by the OOMC 130 of one or more component failures, the BDBS 140 component performs a lookup from a connected database storage system 140b. The database 140b might be local or remote to the bypass component, and the storage might be in memory, on disk, or on any other digital storage medium capable of lookup and retrieval of data upon request. The BDBS 140 retrieves pre-configured data that provides instructions on how specific incoming or outgoing calls should be handled. This data might be associated with specific call locations as indicated by the numbers dialed by the caller initiating a phone call, or the data might be associated with a specific user of the VoIP PBX 120 or a specific SIP device 125 that is experiencing an outage affecting its incoming or outgoing phone calls. For example, in an embodiment, the bypass configuration data 140b might specify that incoming calls intended for a specific phone number or extension associated with a specific SIP device 125 associated with the VoIP PBX 120 should be rerouted, in the case of outage, directly to another specific SIP device 125 or alternatively to another PSTN phone number, which might be a land line phone number or a cell phone. In an alternative exemplary embodiment, the bypass configuration data 140b might specify that outgoing phone calls to specific numbers, such as emergency calls to 911 and local or domestic phone calls, in the case of outage should be routed on a certain network path along with certain data required. Meanwhile, in an alternative embodiment, calls to other specific phone numbers, such as calls to information 411, toll-free calls or international calls to specific locations, in the case of an outage, perhaps should not be rerouted at all. In an exemplary embodiment, these options could be configured individually for specific users or groups of users based on needs and requirements.

For each incoming or outgoing phone call, according to the bypass actions indicated by the configuration data retrieved, the BDBS 140 may attempt to complete the incoming or outgoing call while bypassing the VoIP PBX 120 system components where failures or outages have been detected by the OOMC 130. In an exemplary embodiment, to reroute a phone call while bypassing the VoIP PBX 120, a failed network connection 135, and/or a failed SIP device 125, the BDBS 140 interacts with one or more bypass enablers 140a that are directly in the path of network communications to or from the VoIP PBX 120 and therefore are directly in the path of the network packets that comprise incoming or outgoing SIP and VoIP communications. The bypass enablers 140a could be one of a variety of network devices, software components, or servers of various types that are capable of intercepting SIP and VoIP communications and performing the necessary interactions to reroute or forward these communications directly to or from SIP-enabled communication devices 125 and directly through the PSTN 110. In a further embodiment, the BDBS 140 may interact with the bypass enabler 140a to forward a phone call from its intended destination phone number to an alternate phone number. In some cases, the BDBS 140 may interact with the bypass enabler 140a to forward a phone call to an alternate network path. In an exemplary embodiment, when initiating bypass, the BDBS 140 interacts with one or more bypass enablers 140a to direct incoming or outgoing phone calls to a carrier network, which is capable of completing phone calls on the PSTN.

In a further exemplary embodiment, if the BDBS 140 of the bypass system 101 detects an outage as indicated from the OOMC 130, it then retrieves bypass configuration data 140b, and based on the bypass configuration data 140b determines that for a specific incoming or outgoing phone call it either lacks sufficient information for bypass or that it specifically is prohibited from performing bypass for the specific call (which might happen for outgoing calls to specific locations—long distance, for example), then the BDBS 140 can take alternative actions. In the case of incoming phone calls where bypass configuration data 140b is missing or bypass is not allowed, if the outage information reported by the monitoring component indicates that the voicemail capability of the VoIP PBX is still functioning, then they BDBS 140 may interact with one or more bypass enablers 140a to route the incoming call directly to the voicemail system and the voicemail inbox of the user to which the call was intended.

A further exemplary embodiment can be implemented if voicemail or call routing is not available. In the case of outgoing phone calls where bypass data 140b is missing or bypass is not allowed, or in the case of incoming phone calls where the same is true and monitoring indicates that the voicemail capability of the VoIP PBX is also not available, then the BDBS 140 makes use of a third component to retrieve one or more caller notification audio messages 150. The caller notification audio messages 150 are configured and stored in a local or remote data storage system 150b, and may be configured for specific users, specific types of calls, specific outage conditions, specific calling locations, or any combination of these or other attributes that can logically be associated to calls or VoIP PBX users. The caller notification 150 retrieves the one or more audio messages to be played for an incoming or outgoing phone call, and then the bypass component interacts with one or more bypass enablers 140a to answer the phone call from the caller, play the one or more audio messages 150b to the caller, and then disconnect the phone call. These actions are done without involving the VoIP PBX.

In these exemplary embodiments, theses methods and systems for bidirectional outage bypass for a VoIP PBX, involving an OOMC 130 for outage monitoring, a BDBS 140 for bidirectional bypass, and a component for caller notification 150, constitutes a complete bypass system 101 that provides a heretofore unavailable level of assurance for VoIP PBX users that incoming and outgoing calls can be routed around system failures and that in all other cases callers can be sufficiently notified, and with the ability for user- and group-specific configurations for bypass actions to be put in place. The system 101 can be described in greater details in the description that follows.

Figure 2:
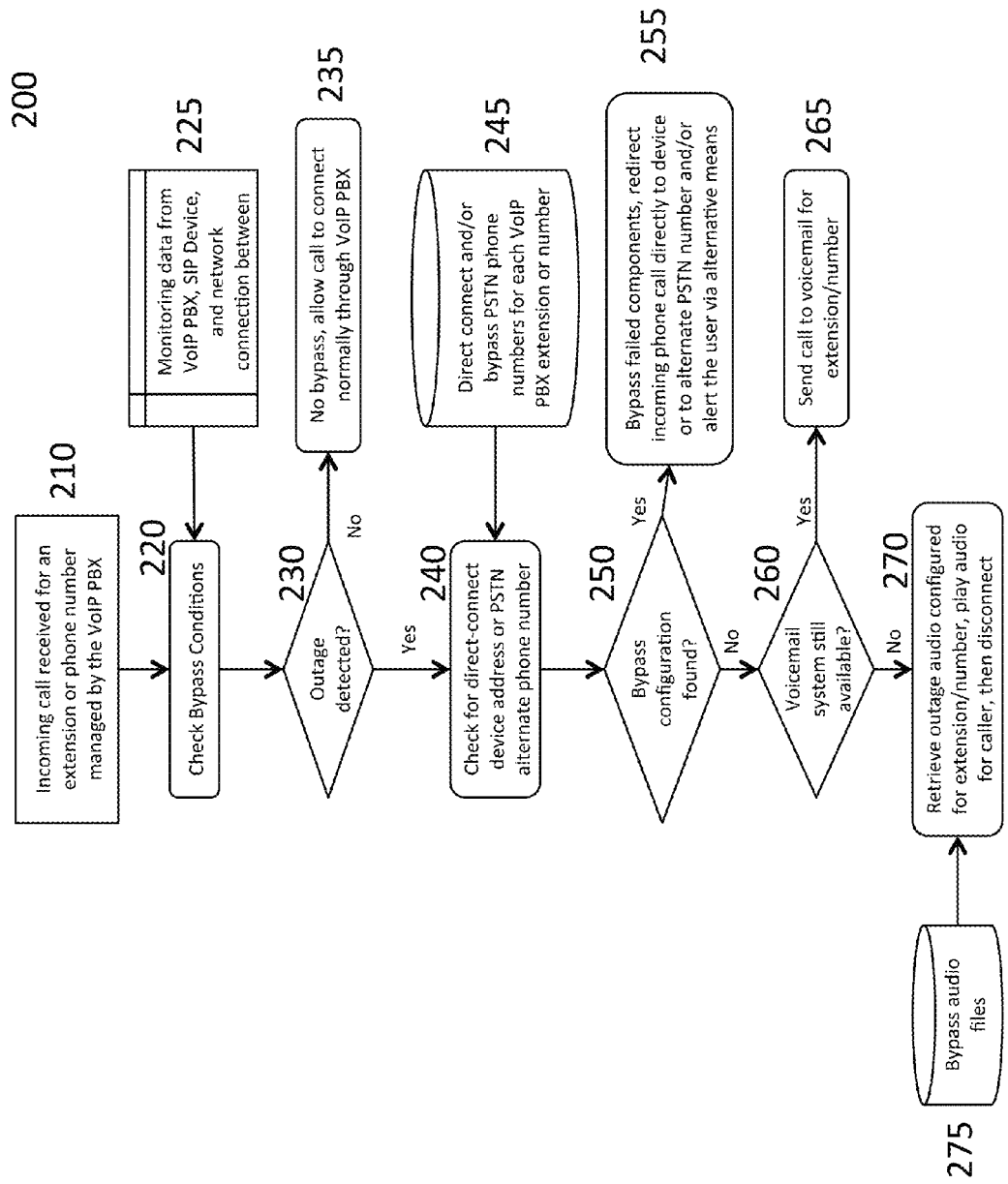
FIG. 2 is a flow chart of an exemplary embodiment of a bidirectional outage bypass system for incoming calls.

Turning now to FIG. 2 in view of the system of FIG. 1, an exemplary bypass method 200 for incoming calls is described. Beginning at step 210 an incoming call from a carrier PSTN network 110 is received for an extension or phone number of a SIP device 125 that is managed by the VoIP PBX 120. As calls come into the VoIP PBX system 100, the OOMC 130 continuously checks the VoIP PBX 120 at step 220 for failures. At step 225 the OOMC 130 continuously monitors data from the VoIP PBX 120, SIP Device 125 status, and/or network connections 135 between the SIP Devices 125 and the VoIP PBX 120. Therefore, in the exemplary embodiment, the OOMC 130 is continuously monitoring network 135, VoIP PBX 120 and/or SIP Devices 125 for outages or failures. This continuous checking of bypass conditions 220 is necessary to provide outage and failure protection. Next the method proceeds to step 230.

A decision point is reached at step 230 wherein the method determines if an outage has been detected. In an exemplary embodiment, if there is no outage or failure detected, the incoming call is allowed to connect normally through the VoIP PBX 120 and eventually on to the appropriate SIP Device 125. However, in a further exemplary embodiment, if an outage or failure is detected for the VoIP PBX 120, SIP Device 125 status, and/or network connections 135 between the SIP Devices 125 and the VoIP PBX 120 the method determines that a bypass around the problem is necessary and therefore, it proceeds to step 240.

At step 240, the BDBS 140 is activated. In an exemplary embodiment, at step 240 the bypass enabler 140a redirects the incoming call to the BDBS 140, wherein the BDBS 140 references the bypass configuration database 140b to determine the particular error handling procedures for the extension or SIP device 125 the incoming call is directed to. In an exemplary embodiment the bypass configuration database 140b can contain error handling procedures for routing the incoming call to a direct connect number and/or a bypass PSTN phone number such as a land line or cell phone number. In an exemplary embodiment, the bypass configuration data 140b contains error-handling procedures for each VoIP PBX extension, number and/or SIP Device 125 on its network. After the method checks for the error-handling procedures at step 240 the method continues to step 250.

In an exemplary embodiment, at step 250, a series of error-handling procedures may be found which the BDBS 140 can be used to route the incoming call and/or otherwise alert the caller or user. Initially, for example, if the error-handling procedures can reroute the incoming call at step 255 by bypassing an outage attributed to the failed components and redirecting the incoming phone call directly to an alternate SIP Device 125 if the VoIP PBX is unaffected by the outage and/or to an alternate PSTN number, if the VoIP PBX is affected by the outage. In a further exemplary embodiment, incoming calls to a particular SIP Device 125 may bypass a VoIP PBX 120 system affected by an outage so that the call can be routed directly to the SIP Device 125 if the Internet protocol (IP) address of the SIP device is known.

The error handling procedures are not limited to call forwarding, however, in an alternative embodiment, the error-handling procedures can alert the user of a SIP Device 125 that an outage exists by using alternative means such as email, text messaging services, social media and the like. For example, the error handling procedures can further alert a user of SIP Device connected to a VoIP PBX 120 system affected by an outage via email or instant message stating, for example, that says "call came from X and couldn't be completed because of system problem" or "a call came from X and was sent to alternative destination Y." However, if there is no alternate number or other error-handling procedure provided in the bypass configuration data 140b, the method will proceed instead to step 260.

In an exemplary embodiment, at step 260 the system checks to see if the voicemail system is active and available and whether the incoming call can be rerouted to voicemail if the error-handling procedures cannot reroute the incoming call at step 250 by bypassing the failed components and redirecting the incoming phone call directly to an alternate number or SIP Device 125 or if the error-handling procedures initially called for the incoming calls to be directed to voicemail. At step 265 the call is sent to the voicemail box of the particular extension or SIP Device 125 to which it was originally directed. However, if the voicemail system is down or otherwise unavailable, in an exemplary embodiment, the method will proceed instead to step 270.

At step 270, the error-handling procedure directs the system to retrieve outage audio configuration data for a particular extension or number. The audio message can be retrieved in a bypass audio file at step 275. In an exemplary embodiment, an audio message may be used to alert the caller that the network is down or otherwise unavailable. At step 270, the audio message is played to the caller and the call is subsequently disconnected.

Figure 3:
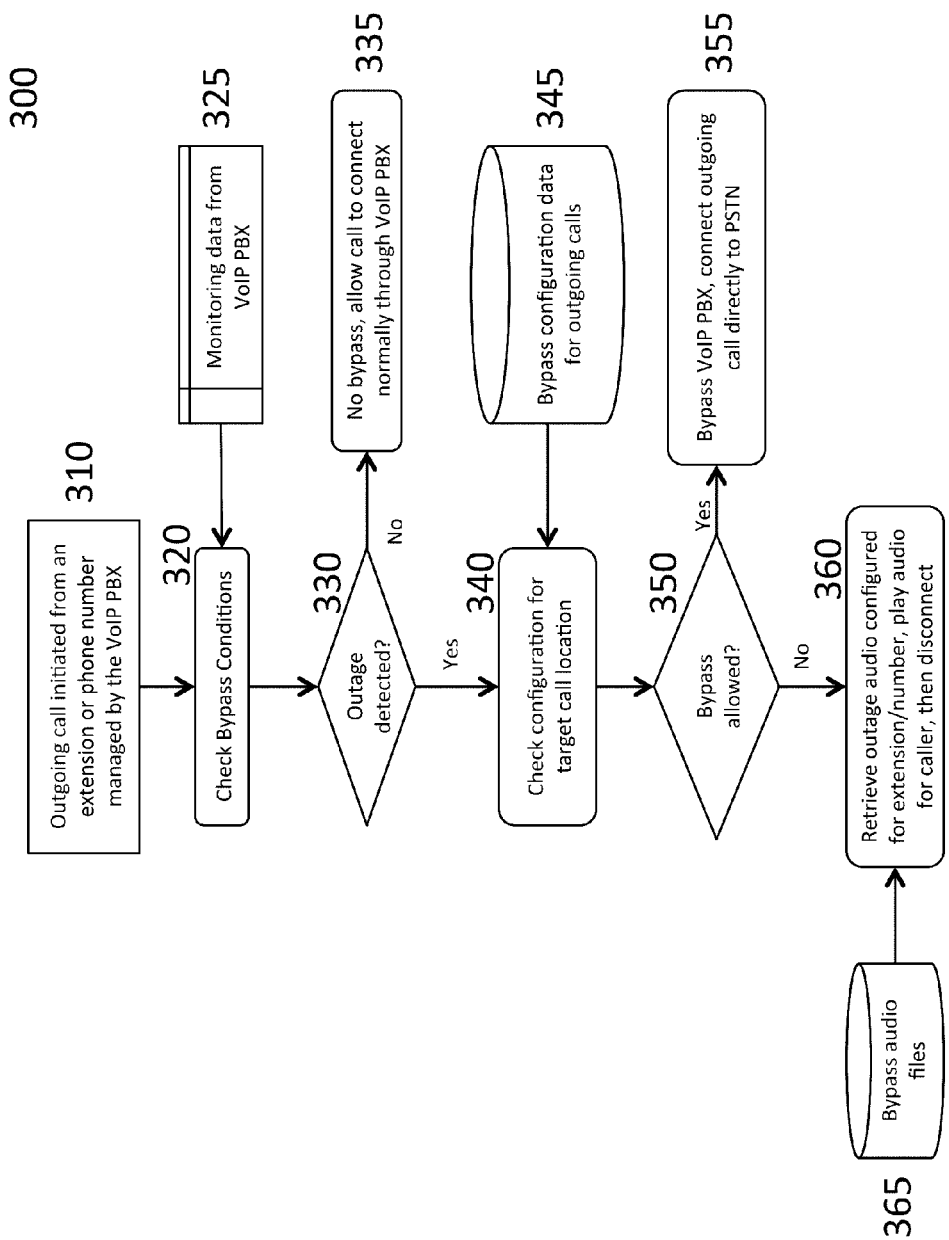
FIG. 3 is a flow chart of an exemplary embodiment of a bidirectional outage bypass system for outgoing calls.

Turning now to FIG. 3 in view of the system of FIG. 1, an exemplary bypass method 200 for outgoing calls is described. Beginning at step 310 an outgoing call is initiated from a SIP Device 125 or extension managed by the VoIP PBX 120. As calls are initiated in the VoIP PBX system 100, the OOMC 130 continuously monitors data from the VoIP PBX 120, status of SIP Devices 125, and/or network connections 135 between the SIP Devices 125 and the VoIP PBX 120. Therefore, in the exemplary embodiment, the OOMC 130 is continuously monitoring network 135, VoIP PBX 120 and/or SIP Devices 125 for outages or failures for the outgoing calls as well at step 325. This continuous checking of bypass conditions 320 is necessary to provided outage and failure protection for outgoing calls. Next the method proceeds to step 330.

A decision point is reached at step 330 wherein the method determines if an outage has been detected. In an exemplary embodiment, if there is no outage or failure detected, the outgoing call is allowed to connect normally through the VoIP PBX 120 and on to the carrier PSTN networks 110, and eventually to an outside party phone 105. However, in a further exemplary embodiment, if an outage or failure is detected for the VoIP PBX 120, SIP Device 125 status, and/or network connections 135 between the SIP Devices 125 and the VoIP PBX 120 the method determines that a bypass around the problem is necessary and therefore, it proceeds to step 340.

At step 340, the BDBS 140 is activated. In an exemplary embodiment, at step 340 the bypass enabler 140a redirects the outgoing call to the BDBS 140, wherein the at step 345 BDBS 140 references the bypass configuration database 140b to determine the particular error-handling procedures for the extension or SIP DEVICE 125 the outgoing call is originated from. Alternatively, the error-handling procedures may be generally directed to all extensions and/or SIP Devices 125 on the VoIP PBX 120 network. After the method checks for the error-handling procedures at step 340 the method continues to step 350.

In an exemplary embodiment, at step 350, a series of error-handling procedures can be found which the BDBS 140 can use to route the outgoing call. For example, if the bypass is allowed at step 350, error-handling procedures can reroute the outgoing call at step 355 by bypassing the failed components and redirecting the outgoing phone call directly to the carrier PSTN network 110. However, if the outgoing call cannot be passed directly to the carrier PSTN network 110 or error-handling configuration so indicates, then the method will proceed instead to step 360.

At step 360, the error-handling procedure directs the system to retrieve outage audio configuration data for a particular SIP Device 125 and/or VoIP PBX system 100. The audio message can be retrieved in a bypass audio file at step 365. In an exemplary embodiment, an audio message may be used to alert the caller that the network is down or otherwise unavailable. At step 360, the audio message is played to the caller and the call is subsequently disconnected.

Figure 4:
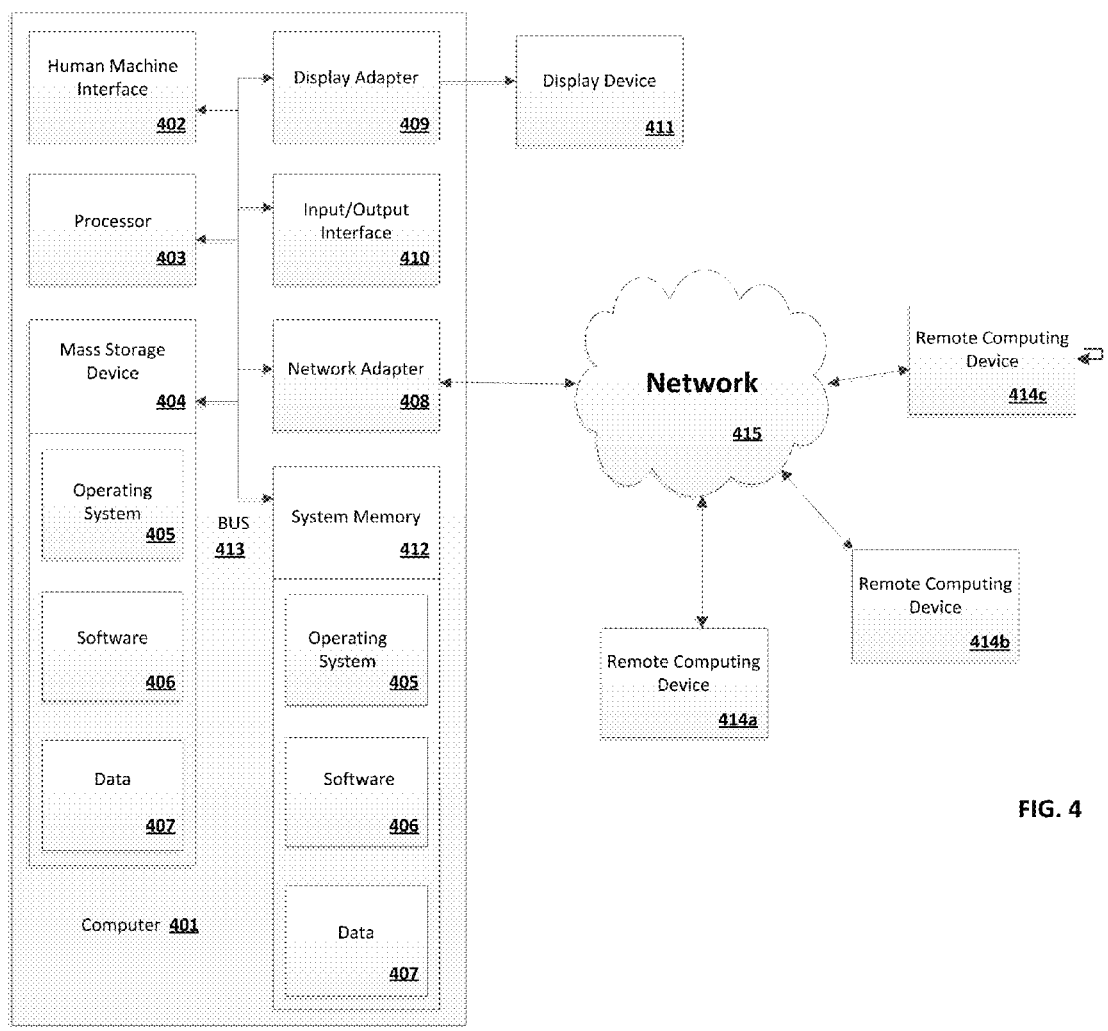
FIG. 4 is a block diagram of an exemplary computing environment that may be used in conjunction with example embodiments and aspects.

Turning now to FIG. 4, one skilled in the art will appreciate that the systems and methods disclosed herein can be implemented via a general-purpose computing device in the form a computer 401. The components of the computer 401 can comprise, but are not limited to, one or more processors or processing units 403, a system memory 412, and a system bus 413 that couples various system components including the processor 403 to the system memory 412. In the case of multiple processing units 403, the system can utilize parallel computing.

The system bus 413 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Private Branch Exchange (PBX) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 413, and all buses specified in this description can also be implemented over a wired or wireless network connection and each of the subsystems, including the processor 403, a mass storage device 404, an operating system 405, software 406, data 407, a network adapter 408, system memory 412, an input/output interface 410, a display adapter 409, a display device 411, a human machine interface 402, can be contained within one or more remote computing devices 414a,b,c at physically separate locations, connected through buses of this form, in effect implementing a fully distributed system.

The computer 401 typically comprises a variety of computer readable media. Exemplary readable media can be any available media that is accessible by the computer 401 and comprises, for example and not meant to be limiting, both volatile and non-volatile media, as well as, removable and non-removable media. The system memory 412 comprises computer readable media in the form of volatile memory, such as random access memory (RAM), and/or non-volatile memory, such as read only memory (ROM). They system memory 412 may contain data such as media, video, audio, or other data 407 and/or program modules such as operating system 405 and software 406 capable of manipulating, translating, transcoding, or otherwise editing the data 407 that are immediately accessible to and/or presently operated on the by the processing unit 403.

In another aspect, the computer 401 can also comprise other removable/non-removable, volatile/non-volatile computer storage media. By way of example, FIG. 4 illustrates a mass storage device 404, which can provide non-volatile storage of computer code, computer readable instructions, data structures, program modules and other data for the computer 401. For example, a mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way of example, an operating system 405 and hosted VoIP PX software 406. Each of the operating system 404 and hosted VoIP PX software 406 (or some combination thereof) can comprise elements of the programming and the hosted VoIP PX software 406. Media, video, audio, or other data 407 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems. Examples of hosted VoIP PX software include Asterisk®, FreeSwitch®, or a Microsoft Lync® server software.

In another aspect, the user can enter commands and information into the computer 401 via client device or an input device (not shown). Example of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 403 via a human machine interface 402 that is coupled to the system bus 413, but can be connected by other interface and bus structures, such as a parallel port, game port, and IEEE 1394 Port (also known as a Firewire port), a serial port, or a universal serial bus (USB).

In yet another aspect, a display device 411 can also be connected to the system bus 413 via an interface, such as a display adapter 409. It is contemplated that the computer 401 can have more than one display adapter 409, and the computer 401 can have more than one display device 411. For example, a display device can be a monitor, an LCD (Liquid Crystal Display), or a projector. In addition to the display device 411, other output peripheral devices can comprise components such as speakers (not shown) and a printer (not shown), which can be connected to the computer 401 via input/output interface 410. Any step and/or result of the methods can be output in any form to an output device. Such output can be any form of visual representation, including but not limited to, textual, graphical, animation, audio, tactile, and the like. The display 411 and computer 401 can be part of one device, or separate devices.

The computer 401 can operate in a networked environment using logical connections to one or more remote computing devices 414a,b,c. By way of example, a remote computing device can be a personal computer, portable computer, smartphone, softphone, client device, a server, a router, a network computer, a peer device or other common network node, and so on. Logical connections between the computer 401 and remote computing device 414a,b,c can be made via a network 415, such as a local area network (LAN) and or a general wide area network (WAN). Such network connections can be through a network adapter 408. A network adapter 408 can be implemented in both wired and wireless environments. Such networking environments are conventional and commonplace in dwellings, offices, enterprise-wide computer networks, intranets, and the Internet.

For purposes of illustration, application programs and other executable program components such as the operating system 405 are illustrated herein as discrete blocks, although it is recognized that such programs and components reside at various times in different storage components of the computing device 401, and are executed by the data processor(s) of the computer. An implementation of media manipulation software 406 can be stored on or transmitted across some form of computer readable media. Any of the disclosed methods can be executed by computer readable instructions embodied on computer readable media. Computer readable media can be any available media that can be accessed by a computer. By way of example and not meant to be limiting, computer readable media can comprise "computer storage media" and "communications media." "Computer storage media" comprises volatile and non-volatile, removable and non-removable media implemented in any methods or technology for storage of information such as computer readable instructions, data structures, program modules, or other data. Exemplary computer storage media comprises, but is not limited to RAM, ROM, EEPROM, flash memory or memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent system (e.g. Expert interference rules generated through a neural network or production rules from statistical learning).

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, mobile phones, softphones, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing a bidirectional outage bypass for a voice-over Internet protocol (VoIP) private branch exchange (PBX) system in response to outages and overload conditions of the VoIP PBX and network failures between the VoIP PBX and client devices managed by the VoIP PBX, comprising:
monitoring outages and overload conditions in the VoIP PBX system and communicating outage updates to a bidirectional bypass system for:
communicating with a first bypass enabler between a publicly switched telephone network (PSTN) and the VoIP PBX for routing incoming communications and a second bypass enabler between the client devices and the VoIP PBX for routing outgoing communications, wherein routing of the incoming and outgoing communications are processed by the first and second bypass enablers, respectively, at the direction of the bidirectional bypass system in accordance with a set of bypass configuration data; and wherein
routing of the incoming and outgoing communications by the first and second bypass enablers comprises routing the communications around the VoIP PBX and directly to one member selected from the group consisting of the PSTN, the Internet, and a messaging system.

2. The method according to claim 1, wherein a predetermined set of rules for responding to outages and overload conditions in the VoIP PBX system is included in the bypass configuration data.

3. The method according to claim 2, for intercepting incoming and outgoing communications with the first and second bypass enablers.

4. The method according to claim 2, for configuring the bidirectional bypass system based on the predetermined set of rules for forwarding incoming communications to an alternate phone number or an alternate client device.

5. The method according to claim 2, for configuring the bidirectional bypass system based on the predetermined set of rules for forwarding incoming communications to a client device voicemail system.

6. The method according to claim 2, for configuring the bidirectional bypass system based on the predetermined set of rules for directing the bidirectional bypass system to play one or more preconfigured audio messages in response to incoming communications.

7. The method according to claim 2, for responding to an outage by directing outgoing communications to one or more preconfigured audio messages based on the bypass configuration data.

8. The method of claim 1, wherein if it is determined that the incoming or outgoing communications lack sufficient information for bypass or that bypass is prohibited, then taking alternative action.

9. A system of providing a bidirectional outage bypass for a voice-over Internet protocol (VoIP) private branch exchange (PBX) system in response to outages and overload conditions of the VoIP PBX and network failures between the VoIP PBX and client devices managed by the VoIP PBX, comprising:
an outage monitoring system;
a bidirectional bypass system in communication with the outage monitoring system for error handling in response to the detected outages, overload conditions and network failures and for directing a first bypass enabler between a publicly switched telephone network (PSTN) and the VoIP PBX to route incoming communications and a second bypass enabler between the client devices and the VoIP PBX to route outgoing communications based on the error handling; wherein,
the bidirectional bypass system configures the first and second bypass enablers based on a set of bypass configuration data; and wherein
the first and second bypass enablers route the incoming and outgoing communications, respectively, by routing the communications around the VoIP PBX and directly to one member selected from the group consisting of the PSTN, the Internet, and a messaging system.

10. The system of claim 9, wherein a predetermined set of rules for responding to outages and overload conditions in the VoIP PBX system is included in the bypass configuration data.

11. The system of claim 10, wherein the predetermined set of rules can configure the bidirectional bypass system to forward incoming communications to an alternate destination.

12. The system of claim 10, wherein the predetermined set of rules can configure the bidirectional bypass system to forward incoming communications to a client device voicemail system.

13. The system of claim 10, wherein the predetermined set of rules can direct the bidirectional bypass system to play one or more preconfigured audio messages to callers for an incoming communication.

14. The system of claim 10, wherein the bidirectional bypass system, in response to an outage, directs outgoing communications from a client device to one or more preconfigured audio messages based on the bypass configuration data.

15. The system of claim 9, wherein if it is determined that the incoming or outgoing communications lack sufficient information for bypass or that bypass is prohibited, then taking alternative action.

16. The system of claim 9, wherein the first bypass enabler and the second bypass enabler comprise one or more of hardware and software components.

17. A method for establishing electronic communications in a voice-over Internet protocol (VoIP) private branch exchange (PBX), wherein the VoIP PBX includes a plurality of VoIP-enabled client devices, comprising the steps of:
monitoring for outages and network overloads in the VoIP PBX system, as well as, monitoring for network failures between a client device and the VoIP PBX;
communicating the outages, overloads and network failures as an error detection to a bidirectional bypass, wherein the bidirectional bypass is in communication with at least one bypass enabler between a publicly switched telephone network (PSTN) and the VoIP PBX for incoming communications and at least one bypass enabler between the VoIP-enabled client devices and the VoIP PBX for outgoing communications;

determining, based on the error detection, error-handling procedures for the bidirectional bypass based on bypass configuration data; and forwarding outgoing communications between a client device and the public switched telephone network (PSTN), in accordance with the error-handling procedures, by bypassing the VoIP PBX and components that are currently experiencing failures or overloads; and forwarding incoming communications for the VoIP PBX in accordance the error-handling procedures, by bypassing the VoIP PBX and components that are currently experiencing failures or overloads.

18. The system of claim 17, wherein the error-handling procedures can alert a user of a client device that an outage exists by using alternative means including one or more of email, text messaging services, and social media.

19. The system of claim 17, wherein the error-handling procedures can direct the system to forward the incoming communication directly to the client device, an alternative number, or alternative client device.

20. The method of claim 17, wherein if it is determined that the incoming or outgoing communications lack sufficient information for bypass or that bypass is prohibited, then taking alternative action.

21. A system of providing a bidirectional outage bypass for a voice-over Internet protocol (VoIP) private branch exchange (PBX) system in response to outages and overload conditions of the VoIP PBX and network failures between the VoIP PBX and client devices managed by the VoIP PBX, comprising:

an outage monitoring system in communication with a bidirectional bypass system and in communication with a first bypass enabler between a publicly switched telephone network (PSTN) and the VoIP PBX and a second bypass enabler between the client devices and the VoIP PBX that act at the direction of the bidirectional bypass system wherein:

the outage monitoring system is configured to detect outages and overload conditions;

the bidirectional bypass system, in response to detection of an outage, determining error-handling procedures for the bidirectional bypass based on bypass configuration data; and wherein;

the second bypass enabler forwards outgoing communications between a client device and the PSTN, in accordance the error-handling procedures, by bypassing the VoIP PBX and components that are currently experiencing failures or overloads; and the first bypass enabler forwards incoming communications from the PSTN for the VoIP PBX in accordance the error-handling procedures, by bypassing the VoIP PBX and components that are currently experiencing failures or overloads.

22. The system of claim 21, wherein the error-handling procedures can alert a user of a client device that an outage exists by using one or more of email, text messaging services, and social media.

23. The system of claim 22, wherein the error-handling procedures can direct the system to forward the incoming communication directly to the client device, an alternative number, or alternative client device.

24. The system of claim 21, wherein the first bypass enabler and the Second bypass enabler comprise one or more of hardware and software components.

* * * * *